United States Patent [19]

Spiegel

[11] 4,274,040
[45] Jun. 16, 1981

[54] SOLENOID TORQUER SYSTEM
[75] Inventor: Leo Spiegel, Sharon, Mass.
[73] Assignee: Northrop Corporation, Los Angeles, Calif.
[21] Appl. No.: 89,554
[22] Filed: Oct. 29, 1979
[51] Int. Cl.³ .............................................. G05B 17/00
[52] U.S. Cl. ................................. 318/689; 318/332; 318/432; 318/456; 318/458; 318/474
[58] Field of Search .............. 318/689, 432, 433, 434, 318/331, 332, 456, 457, 458, 459, 474, 475, 476, 566, 635, 647, 650, 646, 648, 649

[56] References Cited
U.S. PATENT DOCUMENTS

| | | | |
|---|---|---|---|
| 3,378,743 | 4/1968 | Weiser | 318/434 |
| 3,735,226 | 5/1973 | Pittner | 318/432 |
| 3,868,565 | 2/1975 | Kuipers | 318/647 |
| 3,997,975 | 12/1976 | Knapp | 318/689 |
| 4,053,818 | 10/1977 | Younkin | 318/656 |
| 4,152,632 | 5/1979 | Peterson | 318/332 |
| 4,182,979 | 1/1980 | Douglas et al. | 318/689 |

OTHER PUBLICATIONS
Thomas, IEEE Transactions on Biomedical Engineering, Use of a Torque Motor as a Tachometer, Jul. 1977, pp. 388-390.

Primary Examiner—J. V. Truhe
Assistant Examiner—Eugene S. Indyk
Attorney, Agent, or Firm—Kenway & Jenney

[57] ABSTRACT

A solenoid torquer system with flux rate feed-back. The system includes a torquer coil and an associated core, and a device adapted to drive a current through the coil having an amplitude proportional to the difference between a coil current command signal and the actual current in the coil. A flux rate servo loop includes a sensor coil coupled to the core to provide a signal representative of the flux rate in the core. This flux rate signal is compared with a flux rate command signal having a ternary width-modulated form. The resultant difference signal is used as the current command signal. The system network provides a precise flux level, or force.

11 Claims, 5 Drawing Figures

SOLENOID TORQUER SYSTEM

BACKGROUND OF THE INVENTION

The present invention is in the field of torquers, and more particularly relates to solenoid torquers particularly useful in inertial instrumentation.

The development and practical application of tactical two degree of freedom (TDF) inertial instruments has been substantially limited due to deficiencies in the known forms of rotor torquing systems. Consequently, TDF instruments, such as the dynamically tuned gyro (DTG), have been characterized by a relatively high cost and low angular rate capability.

One prior art system utilizes permanent magnet (PM) torquers. However, such systems have thermal sensitivities which typically are so large as to require first order scale factor correction. A second limitaton of PM torquers is the inefficiency of such torquers, particularly in terms of the torque per unit volume provided by the conventional arrangements. The requirement that the permanent magnet be located on the wheel or rotor, results in a greater wheel mass and consequently more power required to torque the wheel for desired corrections.

An alternative prior approach employs a conventional current feedback coil drive in a solenoid torquer configuration. This approach readily provides an improvement of better than order of magnitude in torquing efficiency compared with the permanent magnet torquer. In addition, the cost of the solenoid torquer configuration is significantly less than that of the permanent magnet torquer. The efficiency factor improvement is readily apparent from the relation between gyro drift and torque disturbance. Such drift is proportional to a disturbance torque divided by the angular momentum of the system. Thus, for a given disturbance torque, a larger angular momentum results in a lower drift value. The solenoid torquer permits operation with greater angular momentum for a given torquer size than a permanent magnet torquer, and thus a given disturbance torque results in less drift which requires correction. Furthermore, in an aircraft environment, the larger torque capacity of solenoid torquers provides the ability to balance larger inertial reaction forces. In spite of these advantages over PM torquers, conventional solenoid torquers are severely limited in performance due to problems such as nonlinearity, asymmetry, hysteresis and scale factor instability.

Accordingly, it is an object of the present invention to provide an improved solenoid torquer having precise and efficient high force level torquing.

SUMMARY OF THE INVENTION

Briefly, the solenoid torquer system includes a torquer coil and an associated core having a B-H hysteresis characteristic. An inner current feedback loop provides a coil drive signal for the coil. This signal is proportional to the difference between an applied coil current command signal and a signal representative of the actual current in the coil.

The system further includes a flux rate servo loop for generating the coil current command signal. This loop includes a flux rate sensor coupled to the core and adapted to provide a flux rate signal representative of the rate of change of flux in the coil. In one form, the sensor is an auxiliary coil coupled to the core. The flux rate servo loop further includes a device adapted to compare the flux rate signal to an applied flux rate command signal, and generate the coil current command signal from the detected difference. The flux rate command signal is a ternary width-modulated signal including sequences of four pulses. In each sequence, the first and fourth pulses both have a first polarity which is opposite to that of the second and third pulses. With this configuration, the system has cyclical current reversals, or bifluxing operation. The time integrals of the respective pulses in the flux rate command signal are precisely controlled to determine the operating point of the system along the B-H characteristic of the core.

In operation, precise flux or force levels are commanded by the flux rate servo loop, principally by commanding a fixed magnitude flux rate signal for a set number of clock cycles. The accuracy of the flux rate servo is maintained by using precision voltage sources for a flux rate command signal, a high frequency timing source, (providing low quantization error), low drift high band width servo electronics and a geometrically fixed, stable auxiliary coil for flux rate sensing. With this configuration, the flux rate feedback and associated digital control circuitry provides a precision solenoid torquer system that is substantially insensitive to gap variations, magnetic material changes, hysteresis, soft saturation, temperature and other effects that degrade conventional solenoid torquers.

While being particularly useful in inertial instrumentation, the present invention is also useful in other applications requiring relatively small volume and high torque.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
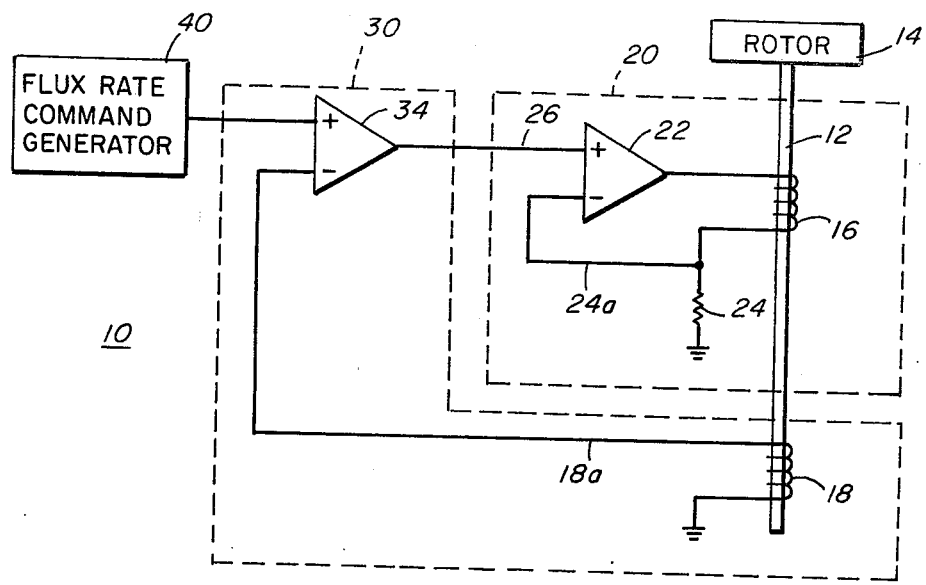
FIG. 1 shows in block diagram form an embodiment of the present invention.

The system 10 shown in FIG. 1 includes a core 12 magnetically coupled to torque a rotor 14. By way of example, the rotor 14 may be of the type used in a DTG. A first coil 16 is wound on core 12 to form a solenoid. A sensor coil 18 is also coupled to core 12 to provide a signal on line 18a which is representative of the rate of change of flux in core 12.

A solenoid coil drive network 20 includes a differential amplifier 22 adapted to provide a coil drive signal to the coil 16. The current passing through coil 16 is shunted to ground by way of a current sensing resistor 24. Signal line 24a is adapted to provide a coil current signal representative of the current passing through the resistor 24, and to apply that signal to one input of the amplifier 22. The other input to amplifier 22 applies a coil current command signal by way of line 26 to the other input of the amplifier 22.

A flux rate feedback network 30 is coupled to the sensor coil 18. The signal on line 18a provides a voltage signal representative of the rate of change of flux through coil 18. This signal is applied as a first input to a differential amplifier 34. A flux rate command signal generated by a network 40 is applied as a second input to that amplifier 34. The difference signal generated by amplifier 34 is applied as the coil current command signal to amplifier 22. In the present embodiment, the flux rate command signal generator 40 includes a high frequency clock generator and a precision voltage source and associated switching circuit to provide a ternary width modulated flux rate command signal including pulses having precisely controlled time integrals.

Thus, the present embodiment includes high gain, wide bandwidth servo loops provided by feedback networks 20 and 30, and the precision drive network provided by generator 40. The flux rate command servo loop generates a precisely controlled flux level, or force, at the rotor 14. To meet this requirement, the flux rate command signal wave form is precisely controlled in both amplitude and timing to insure generation of precise flux rate feedback.

Figure 3A:
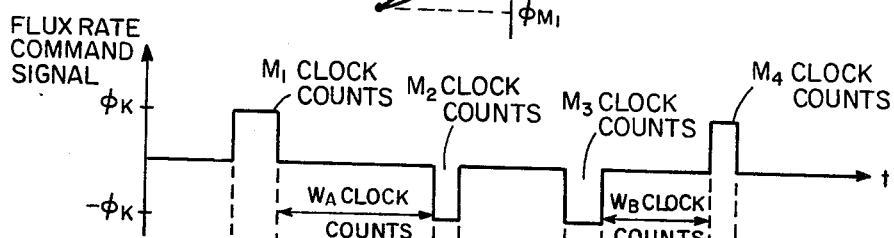
FIGS. 3A and 3B show exemplary flux rate command and flux waveforms for the embodiments of FIG. 1, respectively.
Figure 3B:
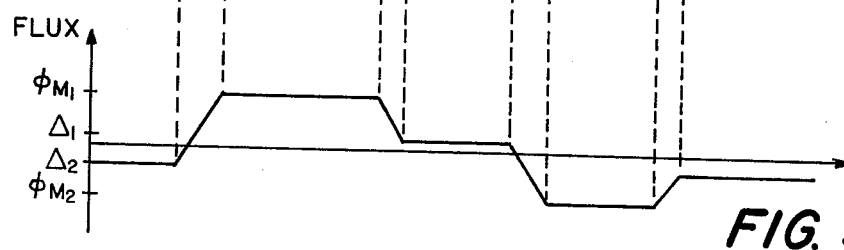

To illustrate the operation of the system 10, core 12 is assumed to have the exemplary hysteresis characteristic shown in FIG. 1, having residual flux values $-\Delta_1$ and $+\Delta_2$ when H=0 and peak flux values $+\phi_{M1}$ and $-\phi_{M2}$. FIGS. 3A and 3B show the flux rate command signal and resultant flux in core 12, respectively, for an exemplary cycle operation of the torquer system of FIG. 1, as the operation starts at point A on the B-H curve and progresses through points B, C, D and A.

In this configuration, the flux rate command signal of FIG. 3A is a ternary, width-modulated signal (voltage levels: $\phi_k$, 0, $-\phi_k$) having a sequence of four pulses. Each of the four pulses in the sequence, as well as the interpulse periods, have durations which are an integer number of clock periods T. The first pulse includes $n_1$ clock periods so that the time integral of the flux rate command signal during that clock period is precisely adjusted in conjunction with the $\phi_k$ value so that the operating point on the B-H characteristic proceeds from point A to point B. The operating point thereafter stays at point B for $W_A$ clock counts as shown. Following that first interpulse period, the second pulse is generated with an amplitude $+\phi_k$ and a duration ($n_2$ clock counts) precisely selected to move the operating point from point B to point C. Following a second interpulse period, the third pulse is generated with an amplitude $-\phi_k$ and a duration ($n_3$ clock counts) precisely selected to move the operating point from point C to point D. Following a third interpulse period (having a duration $W_B$ clock counts), the fourth pulse is generated with an amplitude $+\phi_k$ and a duration ($n_4$ clock counts) precisely selected to move the operating point from point C to point D. After a fourth interpulse period, a similar pulse sequence may be generated.

The flux generated in the core as the operating point passes through points A-D and back to A is shown in FIG. 3B. During the first pulse, the flux changes from $-\Delta_1$ to $\phi_{M1}$, and then remains at that value until the second pulse. During the second pulse, the flux changes from $\phi_{M1}$ to the value $+\Delta_2$, and then remains at that value until the third pulse. During the third pulse, the flux changes from $+\Delta_2$ to $-\phi_{M2}$. During the fourth pulse, the flux changes from $-\phi_{M1}$ to $-\Delta_2$. With this configuration, the force duration or the width of the trapezoidal flux pulses is functionally related to the width modulated values $W_A$ and $W_B$. In the present configuration, the other interpulse spacings are fixed from cycle to cycle. However, in alternative embodiments, the width modulation may be controlled on all or other selected combinations of interpulse periods. With the four pulse configuration duty cycle, there is a periodic flux reversal in the flux pulses applied to the core 12. This is provided to minimize hysteresis effects.

Figure 4:
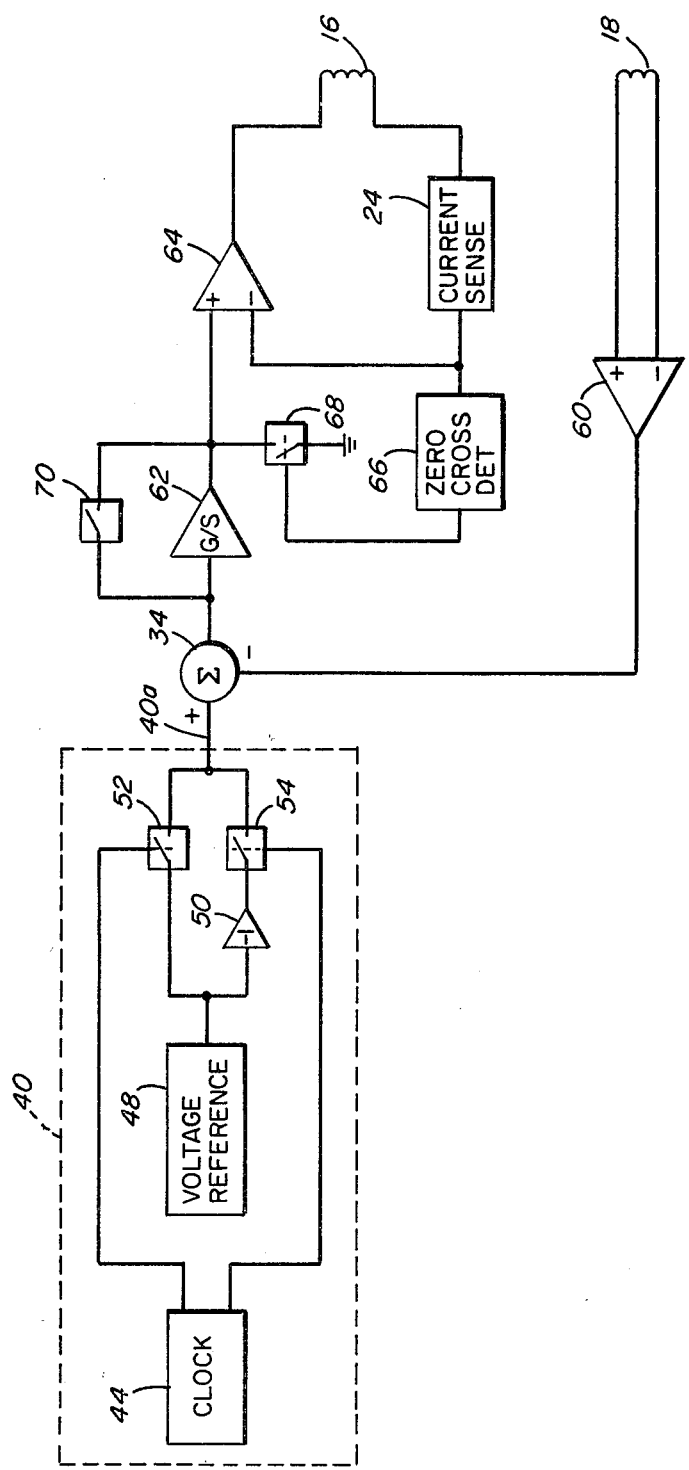
FIG 4 shows in detailed block diagram form the embodiment of FIG. 1.

In the present embodiment, the inner current loop is substantially a conventional current feedback torquer coil drive. The loop has sufficiently high bandwidth so as not to restrict the outer loop characteristic. Thus, the present system controls the flux rate to be constant so that it may be integrated out to a fixed flux amplitude. FIG. 4 shows a more detailed configuration of the present embodiment. In this system, the flux rate command generator 40 is shown to include a dual clock network 44, a precision voltage reference 48, a chopper stabilized inverter amplifier 50, and a pair of switches 52 and 54 controlled by the two clock signals produced by generator 44 which are controlled to provide the flux rate command signal on line 40a. The flux rate coil 18 is coupled to a precision wideband amplifer 62 and a gain function G/s a wideband power amplifier 64, a zero pulsing network 66 and switches 68 and 70 adapted conventionally to perform the current drive function for solenoid coil 16.

In the present system, the four pulses of each sequence have substantially the same amplitude and relatively short rise and fall times. In alternative systems, differing combinations of these same elements may be utilized provided the time integrals are controlled to provide the corresponding travel of the operating point along the B-H characteristic.

Figure 2:
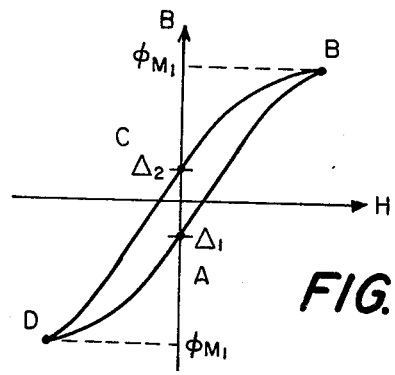
FIG. 2 shows an exemplary B-H characteristic for the core in the embodiment of FIG. 1.

Furthermore, as shown in FIG. 2, the exemplary core has a B-H characteristic which is generally symmetrical about the B and H axes, with the result that the first and third pulses in the flux rate command signal have equal durations, as do the second and fourth pulses, with all pulses having the same magnitude. This configuration provides an operating point trajectory along the B-H characteristic which passes through points A, B, C and D. In alternative embodiment, the pulses may be controlled in either or both amplitude and duration to provide other desired operating point trajectories.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A solenoid torquer system including a torquer coil and associated core, said core having a B-H hysteresis characteristic including a first peak value $+\phi_{M1}$, a second peak value $-\phi_{M2}$, a first residue value $-\Delta_1$ and a second residue value $+\Delta_2$, where $\phi_{M1}$, $\phi_{M2}$, $\Delta_1$ and $\Delta_2$ are greater than zero, $\Delta_1$ is less than $\phi_{M1}$ and $\Delta_2$ is less than $\phi_{M2}$, means for generating a coil current signal representative of the current in said coil, means for generating a coil drive signal proportional to the difference between an applied coil current command signal and said coil current signal, means for applying said coil drive signal to said coil, wherein the improvement comprises:

means for generating a flux rate signal representative of the rate of change of flux in said coil, and means for generating said coil current command signal, said coil current command signal being proportional to the difference between said flux rate signal and an applied flux rate command signal.

2. A solenoid torquer system according to claim 1 wherein $-\Delta_1$ and $\Delta_2$ correspond to the residual flux in said core when the magnetic field H equals zero.

3. A solenoid torquer system according to claim 1 or 2 further comprising:

means for generating said flux rate command signal, said flux rate command signal generating means including:

means for generating a plurality of sequences of four pulses, each sequence including:

a first pulse having a time integral porportional to the sum $\phi_{M1}+\Delta_1$, a second pulse having a time integral proportional to the difference $\phi_{M1}-\Delta_2$, wherein the polarity of said second pulse is opposite to the polarity of said first pulse, a third pulse having a time integral proportional to the sum $\phi_{M2}+\Delta_2$, wherein the polarity of said third pulse is opposite to the polarity of said first pulse, and a fourth pulse having a time integral proportional to the difference $\phi_{M2}-\Delta_1$, wherein the polarity of said fourth pulse is the same as the polarity of said first pulse.

4. A solenoid torquer system according to claim 3 wherein said four pulses have substantially constant amplitude.

5. A solenoid torquer system according to claim 4 wherein said four pulses are characterized by relatively short rise and fall times.

6. A solenoid torquer system according to claim 5 wherein said flux rate command signal generating means comprises:

pulse means responsive to a clock signal having a period T, said pulse means including means for generating said first, second, third, and fourth pulses whereby the durations of said pulses are $n_1T$, $n_2T$, $n_3T$ and $n_4T$, respectively, where $n_1$, $n_2$, $n_3$ and $n_4$ are integers.

7. A solenoid torquer system according to claim 6 wherein said flux rate command signal is a ternary signal and the interpulse periods are integer multiples of T.

8. A solenoid torquer according to claim 7 wherein the interpulse periods between said first and second pulses and between said third and fourth pulses are selectively controlled in response to an applied torquing rate signal.

9. A solenoid torquer system according to claim 3 wherein said flux rate command signal generating means comprises:

pulse means responsive to a clock signal having a period T, said pulse means including means for generating said first, second, third, and fourth pulses whereby the durations of said pulses are $n_1T$, $n_2T$, $n_3T$ and $n_4T$, respectively, where $n_1$, $n_2$, $n_3$ and $n_4$ are integers.

10. A solenoid torquer system according to claim 9 wherein said flux rate command signal is a ternary signal and the interpulse periods are integer multiples of T.

11. A solenoid torquer according to claim 10 wherein the interpulse periods between said first and second pulses and between said third and fourth pulses are selectively controlled in response to an applied torquing rate signal.

* * * * *